US 6,807,592 B2

(12) United States Patent
Singh et al.

(10) Patent No.: US 6,807,592 B2
(45) Date of Patent: Oct. 19, 2004

(54) QUAD PUMPED BUS ARCHITECTURE AND PROTOCOL

(75) Inventors: Gurbir Singh, Gig Harbor, WA (US); Robert J. Greiner, Beaverton, OR (US); Stephen S. Pawlowski, Beaverton, OR (US); David L. Hill, Cornelius, OR (US); Donald D. Parker, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 09/925,691

(22) Filed: Aug. 10, 2001

(65) Prior Publication Data

US 2002/0038397 A1 Mar. 28, 2002

Related U.S. Application Data

(62) Division of application No. 09/474,058, filed on Dec. 29, 1999.

(51) Int. Cl.$^7$ ............................................... G06F 13/00
(52) U.S. Cl. ..................................................... 710/107
(58) Field of Search ................................ 710/100, 107, 710/108, 5, 8, 24, 25, 60, 61; 713/501

(56) References Cited

U.S. PATENT DOCUMENTS 5,280,587 A * 1/1994 Shimodaira et al. ........ 713/600
5,548,733 A   8/1996 Sarangdhar et al.

(List continued on next page.)

FOREIGN PATENT DOCUMENTS

GB     2 318 487 A    4/1998
WO     WO 99/36858    7/1999

OTHER PUBLICATIONS

Pentium® Pro Family Developer's Manual, vol. 1: Specifications 1966, pp. 1–1–A–27 (Chapters 1–17 and Appendix A).

(List continued on next page.)

*Primary Examiner*—Paul R. Myers
(74) *Attorney, Agent, or Firm*—Kenyon & Kenyon

(57) ABSTRACT

A bidirectional multidrop processor bus is connected to a plurality of bus agents. Bus throughput can be increased by operating the bus in a multi pumped signaling mode in which multiple information elements are driven onto a bus by a driving agent at a rate that is a multiple of the frequency of the bus clock. The driving agent also activates a strobe to identify sampling points for the information elements. Information elements for a request can be driven, for example, using a double pumped signaling mode in which two information elements are driven during one bus clock cycle. Data elements for a data line transfer can be driven, for example, using a quad pumped signaling mode in which four data elements are driven during one bus clock cycle. Multiple strobe signals can be temporarily activated in an offset or staggered arrangement to reduce the frequency of the strobe signals. Sampling symmetry can be improved by using only one type of edge (e.g., either the rising edges or the falling edges) of the strobe signals to identify the sampling points.

25 Claims, 9 Drawing Sheets

U.S. PATENT DOCUMENTS

| | | | | |
|---|---|---|---|---|
| 5,550,988 A | * | 8/1996 | Sarangdhar et al. | 710/113 |
| 5,568,620 A | | 10/1996 | Sarangdhar et al. | |
| 5,581,782 A | | 12/1996 | Sarangdhar et al. | |
| 5,615,343 A | | 3/1997 | Sarangdhar et al. | |
| 5,696,910 A | * | 12/1997 | Pawlowski | 710/100 |
| 5,784,579 A | * | 7/1998 | Pawlowski et al. | 710/106 |
| 5,796,977 A | | 8/1998 | Sarangdhar et al. | |
| 5,802,132 A | * | 9/1998 | Pathikonda et al. | 327/115 |
| 5,844,858 A | * | 12/1998 | Kyung | 365/230.01 |
| 5,867,728 A | * | 2/1999 | Melo et al. | 710/8 |
| 5,903,738 A | | 5/1999 | Sarangdhar et al. | |
| 5,919,254 A | * | 7/1999 | Pawlowski et al. | 710/104 |
| 5,937,171 A | | 8/1999 | Sarangdhar et al. | |
| 5,948,094 A | | 9/1999 | Solomon et al. | |
| 5,964,856 A | * | 10/1999 | Wu et al. | 710/107 |
| 5,978,869 A | | 11/1999 | Guthrie et al. | |
| 5,999,023 A | | 12/1999 | Kim | |
| 6,012,118 A | | 1/2000 | Jayakumar et al. | |
| 6,092,156 A | | 7/2000 | Schibinger et al. | |
| 6,108,736 A | * | 8/2000 | Bell | 709/231 |
| 6,172,937 B1 | * | 1/2001 | Ilkbahar et al. | 365/193 |

OTHER PUBLICATIONS

Shanley, "Pentium® Pro and Pentium® II System Architecture," Mindshare, Inc., Second Edition, Addison–Wesley Publ. Co., pp. 199–375.

"Accelerated Graphics Port Interface Specification," Intel Corporation, Revision 1, Jul. 31, 1996.

"Pentium® II Process Developer's Manual," Intel Corporation, Document No. 243502–001, Oct. 1997.

"Intel Multibus® Specification," Intel Corporation, Document No. 9800683–04, 1978–82.

"Multibus® II Bus Architecture Specification Handbook," Intel Corporation, Document No. 146077, Revision C, 1984.

"IEEE Standard for a High–Performance Synchronous 32–Bit Bus: Multibus® II," IEEE, Std. 1296–1987.

* cited by examiner

PROCESSOR BUS 115

US 6,807,592 B2

QUAD PUMPED BUS ARCHITECTURE AND PROTOCOL

CROSS-REFERENCE TO RELATED APPLICATIONS

This application is a divisional of Ser. No. 09/474,058 filed Dec. 29, 1999, pending.

FIELD

The invention generally relates to processors and in particular to a quad pumped bus architecture and protocol.

BACKGROUND

With the increasing complexity and demands of today's software and applications, there is demand for processors to provide increased throughput and bandwidth. There may be one or more resources which can operate to limit computer performance, such as input/output (I/O) speed or bandwidth, memory size, etc. One resource that usually limits or throttles computer performance is the speed and bandwidth of the processor bus or front side bus, which is the bus provided between one or more processors and the chipset. For example, some Pentium® processors (such as a Pentium Pro® processor by Intel Corporation) include a 64 bit data bus and can transfer 8 bytes per processor clock cycle, and can transfer a 32 byte cache line in 4 clock cycles. Thus, if the processor clock is provided at 100 MHz (as an example), the data transfer rate would be 800 Mbytes per second. Various details of the Pentium Pro processor architecture can be found in the "Pentium Pro Family Developer's Manual, Volume 1: Specifications," January, 1996, ISBN 1-55512-259-0. While a data transfer rate of 800 Mbytes per second is sufficient for many applications, a need exists for a processor bus that provides an improved data transfer rate or bandwidth.

SUMMARY

According to an embodiment of the present invention, a method of transmitting information over a multidrop bus from a driving agent to one or more receiving agents is provided. A common bus clock is provided to both the driving agent and the receiving agent. A bus transaction is issued from the driving agent to the one or more receiving agents, including: 1) the driving agent driving multiple information elements for a request onto an address bus at a rate that is a multiple of the frequency of the bus clock; and 2) the driving agent activating a first strobe signal to identify when the receiving agent should sample the information elements driven on the address bus. The method also includes transferring data from the driving agent to the one or more receiving agents including: 1) the driving agent driving multiple information elements onto a data bus at a rate that is a different multiple of the frequency of the bus clock; and 2) the driving agent activating a second strobe to identify when the one or more receiving agents should sample the information elements driven onto the data bus.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein.

DETAILED DESCRIPTION

I. Introduction

According to an embodiment, a processor bus is connected to a plurality of bus agents. The bus is scalable because some types of signals are transmitted using a common clock signaling mode while other types of signals are transmitted using a multi pumped signaling mode.

In a common clock signaling mode, signals (such as control signals) can be driven onto the bus at a rate that is substantially the same as the frequency of a common bus clock. In this mode, the edges of the bus clock identify points for sampling the signals driven onto the bus.

Bus throughput can be increased by operating the bus in the multi pumped signaling mode in which multiple information elements are driven onto the bus by a driving agent at a rate that is a multiple of the frequency of the bus clock. The driving agent also temporarily activates a strobe signal to identify sampling points for the information elements driven in the multi pumped signaling mode. Information elements for a request can be driven, for example, using a double pumped signaling mode in which two information elements are driven during one bus clock cycle. Data elements for a data line transfer can be driven, for example, using a quad pumped signaling mode in which four data elements are driven during one bus clock cycle. Multiple strobe signals can be temporarily activated in an offset or staggered arrangement to reduce the frequency of the strobe signals. Sampling symmetry can be improved by using only one type of edge (e.g., either the rising edges or the falling edges) of the strobe signals to identify the sampling points. In addition, minimum latencies between transaction phases can be modified to more closely match the maximum speed of the bus operating in the multi pumped signaling mode.

II. Architecture

Figure 1:
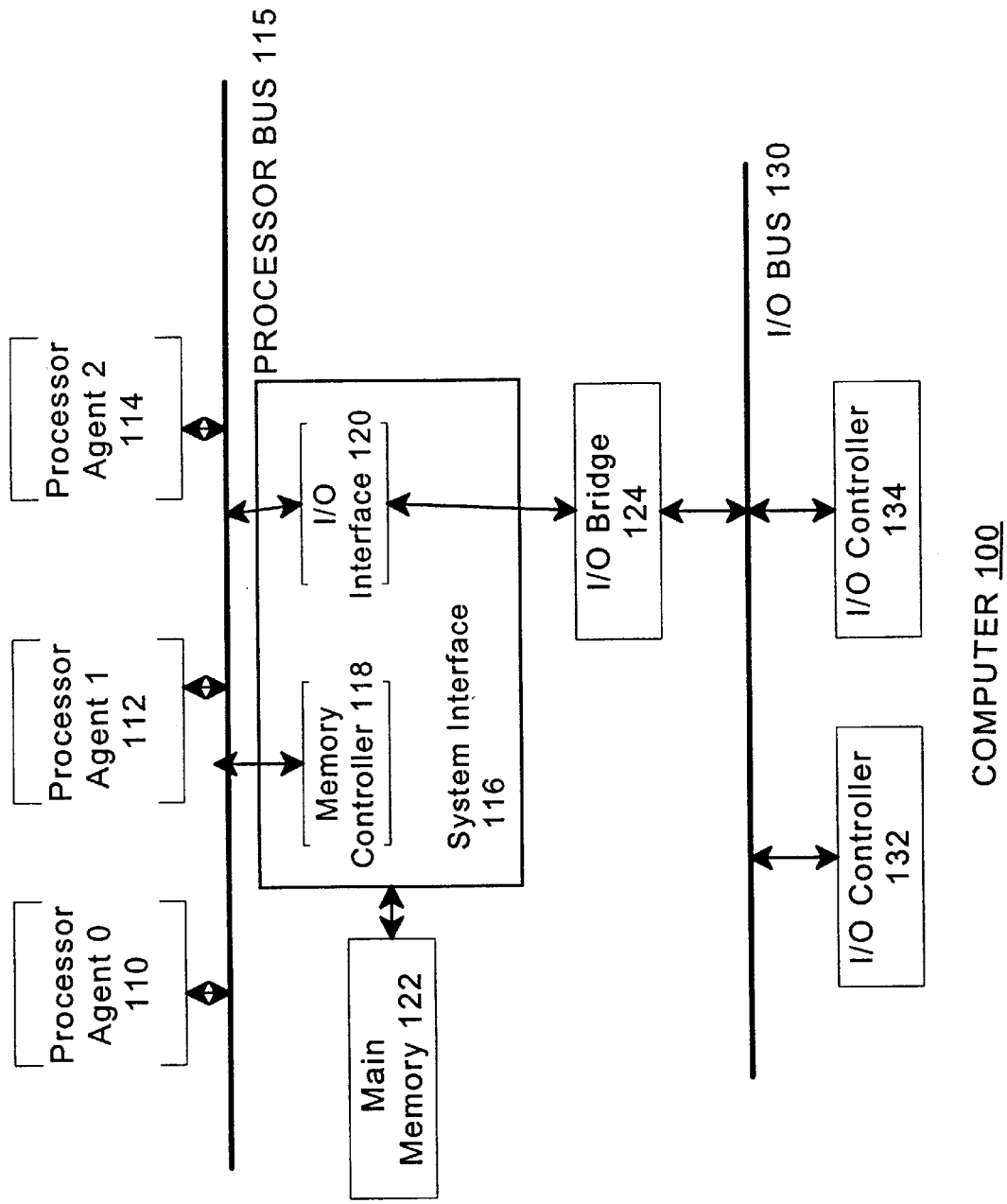
FIG. 1 is a block diagram illustrating a computer according to an example embodiment of the present invention.

FIG. 1 is a block diagram illustrating a computer according to an example embodiment of the present invention. The computer includes one or more processors, including a processor 110, a processor 112 and a processor 114. Each processor also includes an internal cache (not shown).

Figure 2:
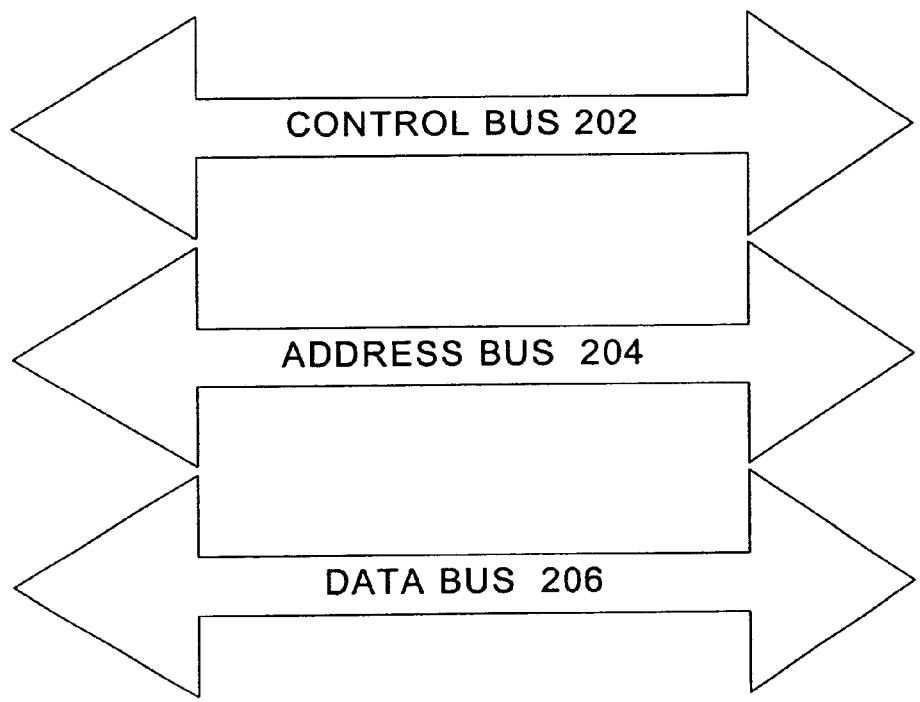
FIG. 2 is a diagram illustrating a processor bus according to an example embodiment.

Each processor is also connected to a common processor bus 117 (also known as the host bus or front side bus). FIG. 2 is a diagram illustrating the processor bus 117 according to an example embodiment. As shown in FIG. 2, the processor bus 117 includes a control bus 202, an address bus 204 and a data bus 206. According to an embodiment, the data bus 206 includes many signals, including 64 data lines D[63:0]. The address bus 204 also includes many signal including 36 address lines A[35:0]. The processor bus 117 includes a bus clock (BCLK). The bus clock is common and is provided to all agents via the control bus 202 of processor bus 117. The control bus 202 also includes many signals. The address bus 204, control bus 202 and data bus 206 are each preferably a multidrop bidirectional buses. According to an embodiment, the term "multidrop" means that the buses are connected to three or more bus agents, as opposed to a point-to-point bus which is connected only between two bus agents.

A system interface 116 (or chipset) is also connected to the processor bus 117 to interface several other components to the processor bus 117. System interface 116 includes a memory controller 118 for interfacing a main memory subsystem 122 to processor bus 117. The main memory subsystem 122 typically includes one or more memory cards and a control circuit. System interface 116 also includes an input/output (I/O) controller 120 to interface one or more I/O bridges or I/O devices to the processor bus 117. In this example computer shown in FIG. 1, the I/O controller 120 interfaces an I/O bridge 124 to the processor bus 117. I/O bridge 124 operates as a bus bridge to interface between system interface 116 and an I/O bus 130. One or more I/O controllers and I/O devices can be connected to the I/O bus 130, such as I/O controller 132 and I/O controller 134, for example. I/O bus 130 may be a Peripheral Component Interconnect (PCI) bus or other type of I/O bus.

III. Agents

Bus agents issue transactions on the processor bus 117 to transfer data and system information. A bus agent is any device that connects to the processor bus 117. There may be several classifications of bus agents:

1) Central Agent: handles reset, hardware configuration and initialization, special transactions and centralized hardware error detection and handling. An example is a processor.

2) I/O Agent: interfaces to I/O devices using I/O port addresses. Can be abus bridge to another bus used for I/O devices, such as a PCI bridge.

3) Memory Agent: provides access to main memory, such as memory controller 118.

A particular bus agent can have one or more of several roles in a transaction:

1) Requesting Agent: The bus agent that issues the transaction.

2) Addressed Agent: The agent that is addressed by the transaction. Also called the Target Agent. A memory or I/O transaction is addressed to the memory or I/O agent that recognizes the specified memory or I/O address. A deferred reply transaction is addressed to the agent that issued the original transaction.

3) Snooping Agent: A caching bus agent that observes ("snoops") bus transactions to maintain cache coherency.

4) Responding Agent: The agent that provides the response to the transaction (typically the addressed agent). According to an embodiment, the responding agent drives the response onto the control bus using the response strobes RS[2:0 ].

IV. Operations, Transactions and Phases

According to an embodiment, bus activity on the processor bus 117 is hierarchically organized into operations, transactions and phases.

An operation is a bus procedure that appears atomic (e.g., appears to be indivisible or appears to happen at one time) to software even though it may not be atomic on the bus 117. An operation may consist of a single bus transaction, but sometimes may involve multiple bus transactions or a single transaction with multiple data transfers. Examples include a read operation, a write operation, a locked read-modify-write operation and deferred operations.

A transaction is the set of bus activities related to a single bus request. A transaction begins with bus arbitration, and the assertion of the ADS# signal (indicating that an address is being driven) and a transaction address. Transactions are driven, for example, to transfer data, to inquire about a changed cache state, or to provide the system with information.

A phase uses a specific set of signals to communicate a particular type of information. The phases can include: arbitration, request, snoop, response and data. Not all transactions contain all phases, and some phases can be overlapped. The arbitration phase is where the bus agents determine who will be the next bus owner (an agent must own the bus before issuing a transaction). The request phase is the phase where the transaction is issued to the bus. The snoop phase is the phase where cache coherency is enforced. The response phase is the phase where the addressed or target agent drives a transaction response onto the bus. In the data phase, the requesting or responding or snooping agent drives or accepts the transaction data.

Four control signals transmitted over the processor bus 117 include a bus clock BCLK[1:0], the initialization signal INIT# and the reset signal RESET#. The bus clock BCLK [1:0] are the differential bus clock and may be generated by a clock chip or clock circuitry. The two bus clock signals, BCLK[1:0], are logically identical and physically routed as two separate signals to reduce timing skew. According to an embodiment, all agents drive their common clock outputs and latch their common clock inputs on the bus clock rising edge. Each processor derives its internal clock from the bus clock BCLK signal by multiplying and/or dividing the bus clock frequency by a number or numbers.

According to an embodiment, the RESET# input signal resets all bus agents to known states and invalidates their internal caches. Modified or dirty cache line contents are lost. After RESET# is deasserted, each processor begins execution at a power on reset vector defined during configuration.

According to an embodiment, the INIT# input signal resets all processors without affecting their internal caches or their floating point registers. Each processor begins execution at a power on reset vector defined during configuration.

Figure 3:
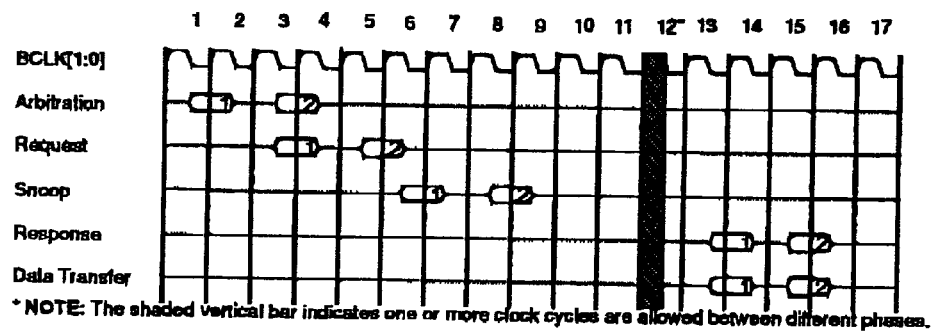
FIG. 3 is a timing diagram illustrating example bus transaction phase relationships for two example transactions according to an embodiment.

FIG. 3 is a timing diagram illustrating example bus transaction phase relationships for two example transactions according to an embodiment. The cycles ( 1, 2, 3, 4, . . . 17) of the bus clock (BCLK [1:0]) are shown at the top. The rectangles having a number 1 indicate various phases for transaction 1, while the rectangles having a number 2 indicate phases for transaction 2. As can be seen from FIG. 3, the transactions are provided in a pipelined fashion. For example, for transaction 1, arbitration occurs in bus clock cycles 1 and 2, request occurs in cycles 3 and 4, snoop occurs in cycles 6 and 7, and response and data transfer occur in cycles 13 and 14. Thus, it can be seen that a response and data transfer may occur many bus clock cycles after the original request phase. Also, there can be overlap between phases of different transactions. For example, the arbitration phase for transaction 2 occurs at approximately the same time as the request phase for transaction 1.

V. Signaling Modes

According to an embodiment, the processor bus 117 is scalable and supports two signaling modes. The first is a common clock signaling mode in which all signal activation and sampling or latch points occur with respect to a common bus clock (BCLK#) that is continuously provided between all agents. The bus clock is typically generated by a clock chip or clock circuit provided on a motherboard, and is common to all processors or agents in a computer. Signal clocking with respect to the common bus clock is referred to as common clock (1×) signaling mode. According to an embodiment, many control signals provided over the control bus are transmitted using the common clock (1×) signaling mode.

A second signaling mode is a multi-pumped signaling mode which allows an information transfer rate that is a multiple of the transfer rate supported by the common clock signaling mode. Thus, according to an embodiment, the multi-pumped signaling mode can support information transfer over the processor bus 117 between agents at a rate that is a multiple of the frequency of the common (i.e., system) bus clock. For example, the multi-pumped signaling mode may provide for example a double pumped signaling mode which allows information (e.g., data, addresses or other information) to be transferred at twice (2×) the rate of the common clock frequency, or may provide a quad pumped signaling mode which provides for information transfer at four times (4×) the bus clock frequency. To facilitate the transfer of information at such rates or frequencies which are greater than the common bus clock, the driving agent also issues or provides a companion signal known as a timing "strobe" used by the receiver as a reference for capturing or latching the multi-pumped information.

The term asserted means that a signal is driven to its active level (i.e., driven to a zero for an active low signal), and the term deasserted means the signal is driven to its inactive level. The square, circle and triangle symbols are used in some timing diagrams described below to indicate when particular signals are driven or sampled. The square indicates that a signal is driven (asserted, initiated) in that clock cycle. The circle indicates that a signal is sampled (observed, latched) in that clock cycle. The circle is typically used to show a sampling point based on a rising (or falling) edge of the bus clock (BCLK) in the common clock (1×) signaling mode. The triangle indicates that a signal is sampled or captured based on a rising or falling edge of a companion signal, termed a "strobe." The strobe may preferably be on or activated only during the transmission of information (e.g., data, addresses, other information) over the processor bus typically in a multi-pumped mode.

A. Common Clock Signaling Mode

According to an embodiment of the common clock (1×) signaling mode, all agents on the processor bus 117 are required to drive their active outputs and sample required inputs. According to an embodiment, every input should be sampled during a valid sampling interval on a rising edge of the bus clock and its effect or result be driven out onto the bus 117 no sooner than the next rising bus clock edge. This example approach allows one full bus clock cycle for inter-component communication (signal transmission and propagation) and at least one fall bus clock cycle at the receiver to interpret the signals and compute and output a response. As a result, after an agent drives data onto the processor bus in one or more bus clock cycles, there is a pause of one bus clock cycle (e.g., a dead cycle or inactive cycle) before another agent can drive the processor bus 117.

Figure 4:
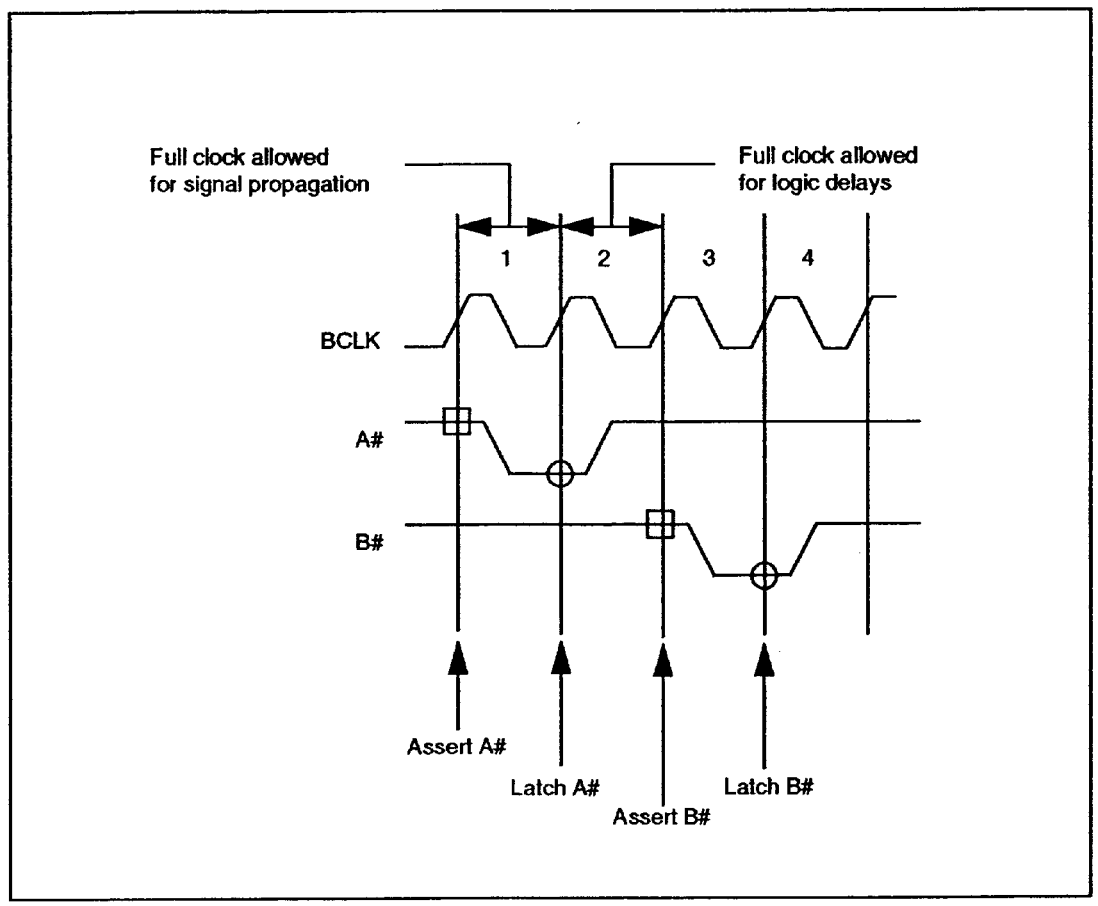
FIG. 4 is an example timing diagram illustrating an example operation of the common clock signaling mode according to an embodiment.

FIG. 4 is an example timing diagram illustrating an example operation of the common clock (1×) signaling mode according to an embodiment. The signals are shown as they appear on the processor bus 117. Four cycles of the bus clock (BCLK) are shown. Two additional example signals are also shown, including A# and B#, which may be any type of signals. For example, A# may be a first control signal from a first agent, while B# may be a second signal from a second agent. The first and second control signals may be provided as part of a handshake or bus protocol, for example.

As shown in FIG. 1, the signal A# is driven (or asserted) at the rising edge of clock cycle 1 (as shown by the square in A#), and is latched at the receiver at a rising edge at the beginning of bus clock cycle 2 (as shown by the circle for A#). Thus, clock cycle 1 is provided for signal propagation. While A# is asserted at the beginning of cycle 1, it is not observed on the bus until the beginning of cycle 2. Then, there is a pause or inactive clock cycle (during bus clock cycle 2 for logic delays and for the receiver to interpret the signals). The receiver then drives or asserts the B# signal at the beginning of bus clock cycle 3 (as shown by the square for B#), which are observed and captured by the other agents at the beginning of cycle 4 (as shown by the circle for B#).

According to an embodiment, a processor includes a 64-byte cache line (instead of 32-byte cache line used in some Pentium processors). Therefore, if data were transferred using the common clock (1×) signaling mode and 64 data bus lines, 64 bytes (one cache line) of data could be driven or transferred in 8 bus clock cycles. However, in many applications, it may be desirable to provide a faster data transfer rate or greater bandwidth.

B. Multi-Pumped Signaling Modes

In many instances, the length of processor bus 117, electrical limitations (including the latency for signal propagation across the bus) may preclude increasing the processor bus frequency. Therefore, according to an embodiment, rather increasing processor bus clock frequency, the multi-pumped signaling protocol increases the data transfer rate (over the common clock signaling mode) by operating the appropriate bus signal group (e.g., address bus or data bus) at a multiple of the frequency of the bus clock (BCLK).

1. An Example of A Quad Pumped Signaling Mode

In the quad pumped signaling mode, the appropriate bus signal group is operated at four times (4×) the frequency of the bus clock (BCLK). In other words, in quad pumped signaling mode, four elements of information are driven onto the processor bus 117 in one bus clock cycle (which is the time it would take to drive one element of information in the common clock or 1× signaling mode).

Figure 5:
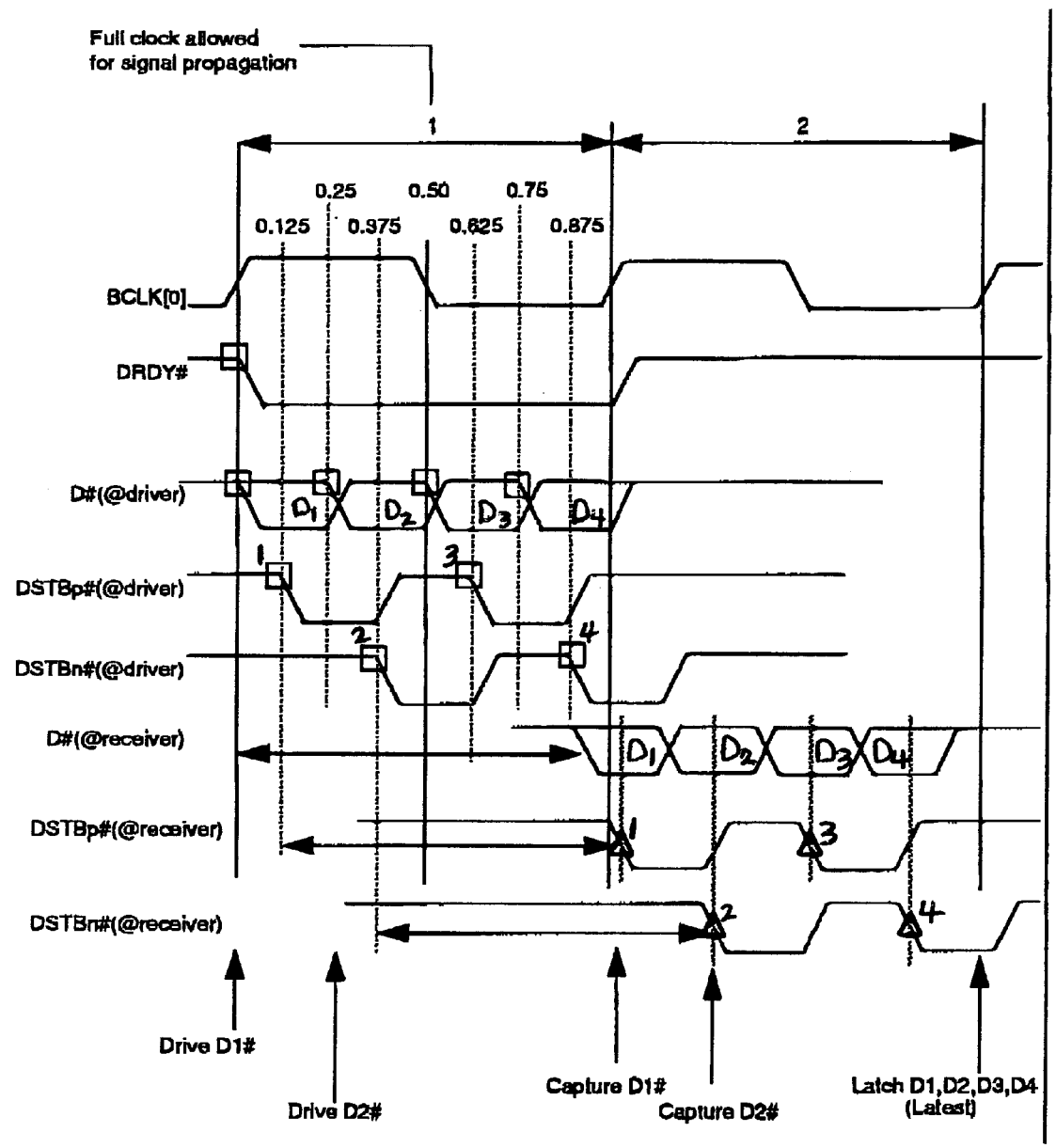
FIG. 5 is a timing diagram illustrating operation of an example quad pumped signaling mode according to an embodiment.

FIG. 5 is a timing diagram illustrating operation of an example quad pumped signaling mode according to an embodiment. Although the quad pumped signaling mode can be used for any type of signals, the quad pumped signaling protocol is used to transmit data according to an example embodiment. Two bus clock cycles and a portion of a third bus clock cycle are shown in FIG. 5. The worst case flight time (or signal propagation time) across the processor bus 117 is such that a second information element may be driven onto the processor bus 117 at the driver (i.e., the agent driving information onto the processor bus) before the first information element has been latched at the receiver (receiving agents).

According to an embodiment, the driver (or driving agent) sends or drives a new information element on the rising edge, and the 25%, 50% and 75% points of the bus clock (BCLK) cycle.

The receiver also sends a companion timing signal known as a data strobe signal that indicates when the receiver should sample or capture the data. The strobe signal is preferably sent or driven (activated) only when information is sent using the multi-pumped signaling mode.

Because the data and the strobe signals are generated by the same driver or source, the data and strobes will have the same path. As a result, the strobe signal and the data signals should have the same path and therefore approximately the same delay. Therefore, an advantage achieved by the driver or source sending both a strobe and data is that the data signals and the strobe signal will arrive in-phase (or synchronous) at each agent on the bus 117. Thus, this technique of a driver sending both the data and a timing strobe signal can be referred to as a source synchronous transfer.

In the quad pumped signaling mode, there should be four data strobes (e.g., four timing strobe edges) each identifying an information sampling or capture point) in each bus clock cycle, one for each of the four data elements. Unfortunately, problems may arise in generating a strobe signal at relatively high frequencies. At high clock speeds, the difference between the rising edge rate and the falling edge rate can be significant. In addition, it may be difficult to provide a clock signal or strobe signal having a 50% duty cycle. As a result, at some high clock frequencies, both the rising edge and falling edge of the strobe signal should not be used to identify sampling points as this may create asymmetry or introduce a degree of timing uncertainty. Rather, it may be advantageous to use only one of the two edges of the strobe (i.e., use only the rising edges or only the falling edges of the strobe signals for sampling or capturing the quad-pumped data) to obtain more symmetric or uniform strobe timing or sampling intervals.

If only one of the edges of the strobe is used, then this would typically require a clock frequency that is a multiple of the bus clock frequency. In the case of quad pumped data (four data elements per bus clock cycle), the strobe signal frequency should be four times (4×) the bus clock frequency if only one edge is used for timing.

Unfortunately, if the processor clock frequency is 100 MHz (for example), this would require a strobe signal frequency that is 400 MHz (in this example). However, a strobe signal frequency that is four times the bus clock frequency may encounter delays which differ from the transmitted data or information, which could affect the alignment of the data and strobe at the receiver. Such a misalignment between the transmitted strobe signal and the transmitted data may cause the receiver to capture bad or incorrect data. In addition, signal attenuation can be significantly higher at such high frequencies (e.g., 400 MHz).

Therefore, according to an embodiment, multiple data strobe signals are used to provide the four strobes per bus clock cycle without using a strobe frequency that is four times (4×) the bus clock frequency. According to an embodiment, two data strobe signals (DSTBp# and DSTBn#) are provided each at twice the frequency of the bus clock. Thus, if the bus clock frequency is 100 MHz, the two data strobe signals will each have a frequency of 200 MHz when activated or generated by the driver (or driving agent). Alternatively, four data strobe signals could be used (each at the same frequency as the bus clock when activated) each providing one strobe or falling edge per bus clock cycle.

Referring again to the timing diagram of FIG. 5, the driver sends or drives a new information or data element on the rising edge, and the 25%, 50% and 75% points of the bus clock cycle 1. The data elements are labeled as D1, D2, D3 and D4 for the four data elements in this example. This embodiment also uses two data strobe signals, including DSTBp# and DSTBn#. According to an embodiment, the two data strobe signals are generated out of phase from each other (or in a staggered or offset arrangement). This allows one of the strobe signals to identify sampling points for the odd data elements (e.g., D1, D3, D5, . . . ) and the other strobe signal to be used for the even data elements (e.g., D2, D4, D6, . . . ).

Although only two strobe signals are shown in the example of FIG. 5, any number of strobe signals can be used to identify sampling points for the data of a source synchronous transfer. As noted above, it can be especially advantageous to provide multiple strobe signals so that only one of the two edges of the strobe signals can be used to identify sampling points (or strobes) while lowering the frequency of the strobe signals. For example, if a 6× pumped protocol were used (instead of quad pumped), three strobe signals could be used, where all three strobe signals could be similarly offset or staggered such that strobe 1 could be used for data elements D1 and D4, strobe 2 for data elements D2 and D5 and strobe 3 for data elements D3 and D6, etc.

According to an embodiment, only one of the two edges of the strobe signals are used for identifying or synchronizing data sampling points. In this particular embodiment, only the falling edges of the two data strobe signals are used to identify points for sampling the information or data. The data strobes (or falling edges of the data strobe signals) are centered in each of the four information or data elements. Thus, the four falling edges (or strobes) of the data strobe signals will occur on the 12.5%, 37.5%, 62.5% and 87.5% points of the bus clock (BCLK) cycle. Therefore, the two strobe signals provide equally spaced strobes or falling edges.

As shown in FIG. 5, a DRDY# is driven onto the bus 117 at the beginning of bus clock cycle 1 (as shown by the square for DRDY#). DRDY# indicates that valid data has been placed on the processor bus 117 and must be sampled or captured. The first data element (D1) is driven by the driver onto the processor bus 117 at the rising edge of bus clock cycle 1 (as shown by the first rectangle for D#(@driver)). A first data strobe signal (DSTBp#) is then activated by the driver at the 12.5% point of the first bus clock cycle, as shown by the first square in DSTBp# (@driver). Thus, the strobe (or falling edge) for the first data element (D1) is centered in the first data element. Once a strobe signal has been activated or turned on, it typically continues activated until the data has been driven onto the bus.

Also, a second data element is driven by the driver at the 25% point of the bus clock cycle 1, as shown by the second rectangle for D#(@driver). The second data strobe signal (DSTBn#) is activated at the 37.5% point of bus clock cycle 1 and provides a falling edge (or strobe) that is centered in the second data element (D2).

Likewise, the third and fourth data elements (D3 and D4, respectively) are driven at the 50% point and the 75% point of bus clock cycle 1. Corresponding data strobes (falling edges of the data strobe signals) are driven or provided by the driver at the 62.5% point (by the DSTBp# strobe signal) and the 87.5% point (by the DSTBn# strobe signal). Because the data strobe signals are provided at a frequency that is two times (2×) the frequency of the bus clock, each data strobe signal will provide a strobe or falling edge every ½ bus clock cycle. Thus, the DSTBp# strobe signal provides falling edges or strobes at the 12.5% and 62.5% points of the bus clock cycle, while the DSTBp# strobe signal provides falling edges or strobes at the 37.5% and 87.5% points of the bus clock cycle.

Thus, it can be seen that the two data strobe signals (DSTBp# and DSTBn#) are staggered or out of phase with each other. This allows alternating strobe signals to provide a falling edge (or strobe) every quarter of a bus clock cycle (between both data strobe signals). This provides four strobes or falling edges per bus clock cycle for identifying sampling or capturing points for the four data elements per bus clock cycle, while decreasing the frequency of each strobe. Moreover, timing and circuitry is simplified because the same edge (in this example the falling edge) is used as the strobe in each data strobe signal.

According to an embodiment, to ensure correct operation, the latency of the information transfer from the driving agent to any receiver should be less than or equal to one bus clock minus the input latch setup time. This will avoid contention on the data lines for the subsequent data phase if the receiver becomes the bus owner during the next phase.

FIG. 5 also shows the capturing of the data at the receiver. After the signals (data and data strobes) are driven by the driver, these signals propagate down the processor bus 117 and reach the target or receiver. The first data element is received at the receiver, as shown by the D#(@receiver) signal. The first data element (D1) is sampled or captured on the first strobe, which is the first falling edge of DSTBp# (@receiver). The first triangle for the DSTBp#(@receiver) identifies the strobe or point for sampling or capturing the first data element, and the second triangle for the DSTBp# (@receiver) identifies a point or strobe for sampling the third data element at the receiver. Likewise, the two triangles for the second data strobe signal (DSTBn# (@receiver)) identify the points for the receiver to sample or capture the second and fourth data elements (D2, D4).

As shown in FIG. 5, the first data element D1 may be sampled or captured (strobed) into the receiver after the rising edge at the beginning of clock 2, and no sooner than the 12.5% point of clock cycle 2 (the next clock cycle). (As used herein, the terms "capturing", and "sampling" and "latching" are loosely used to mean approximately the same thing). However, the data for all data elements is not latched into the receiver until the rising edge of bus clock cycle 3. Thus, while the data element D1 is received and captured near the beginning of bus clock cycle 2, all the data is not made available to the receiver until the beginning of bus clock cycle 3. The receiving agent preferably includes a FIFO (first in, first out) buffer that is sufficient to store eight data elements. The eight data element FIFO is large enough to store the four elements of one data transfer and the next four elements for the next transfer. This allows four new data elements to be received and captured while the previous four data elements are being popped or latched out from the FIFO to the receiver. The net effect is four times the bandwidth of the common clock signaling mode with the effect of adding latency for the first signal group latched inside the receiver or device.

In addition, according to an embodiment, multiple lines are used to carry multiple copies of each of the two data strobe signals (DSTBp# and DSTBn#). According to an embodiment, there are four DSTBn# signals and four DSTBp# signals, as expressed in the following table.

Example Embodiment of Data Strobe Coverage

| Data Signals | Strobes |
| --- | --- |
| D[15:0]# | DSTBp0#, DSTBn0# |
| D[31:16]# | DSTBp1#, DSTBn1# |
| D[47:32]# | DSTBp2#, DSTBn2# |
| D[63:48]# | DSTBp3#, DSTBn3# |

The four DSTBp# signals are logically identical, as are the four DSTBn# signals, but each of the data strobe signals is physically routed with a subset of the request signals (i.e., a subset of the data lines) to reduce timing skew or misalignment between the data and the data strobe signals.

Figure 8:
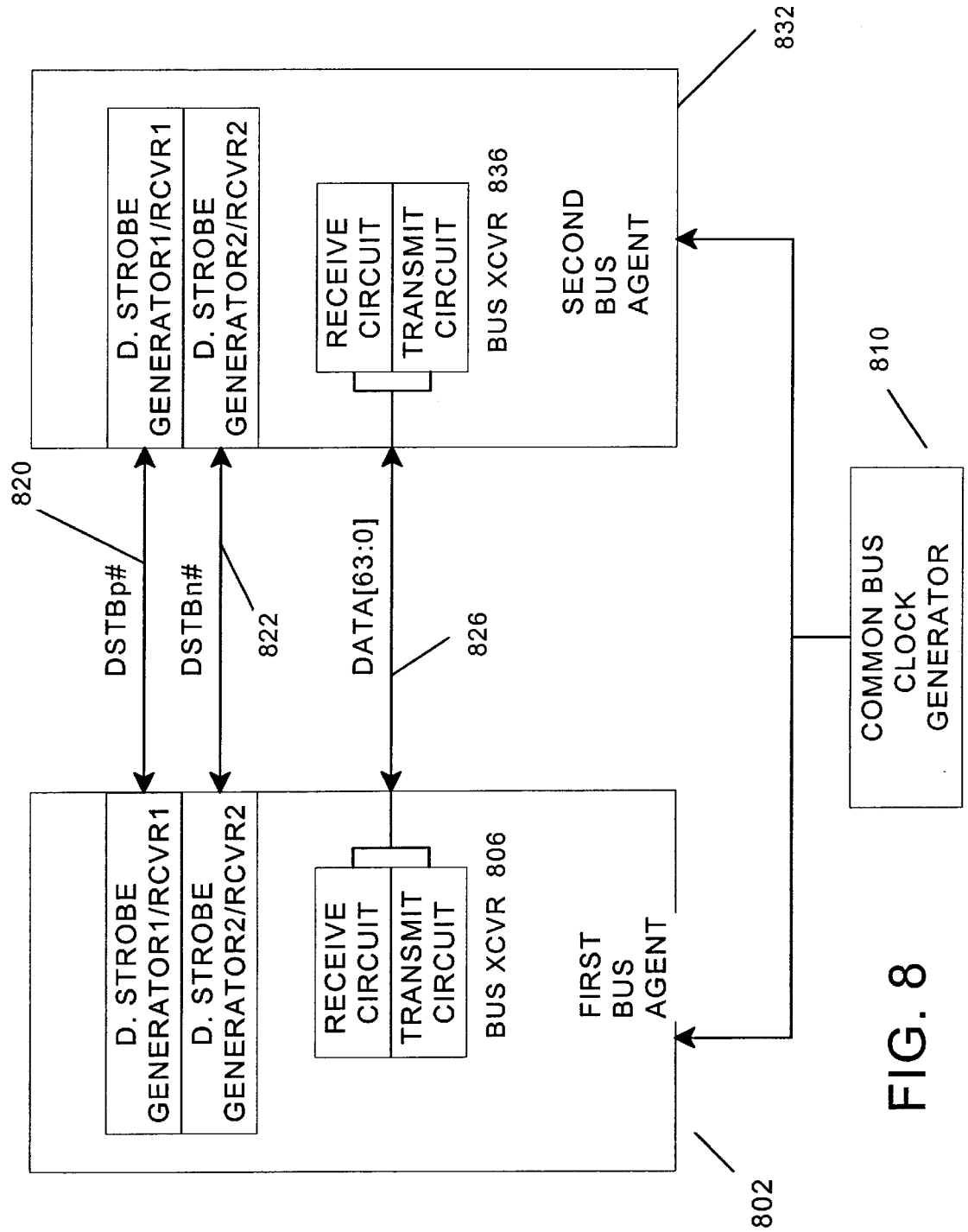
FIG. 8 is a block diagram of an apparatus for transferring information between agents according to an embodiment.

FIG. 8 is a block diagram of an apparatus for transferring information between agents according to an embodiment. A first bus agent 802 is connected to a second bus agent 832. The first bus agent 802 includes a data strobe generator 1/receiver 1 for generating and receiving a first data strobe signal (e.g., DSTBp#) over a first bidirectional data strobe signal line 820, and a data strobe generator 2/receiver 2 for generating and receiving a second data strobe signal (e.g., DSTBn#) over a second bidirectional data strobe signal line 822. Bus agent 802 also includes a bus transceiver 806 including a transmit circuit for transmitting or driving data signals onto the data bus or data signal lines 826 and a receive circuit for receiving data signals received over the data signal lines 826. The second bus agent 832 similarly includes a data strobe generator 1 and a data strobe generator 2 for generating two data strobe signals onto the data strobe signal lines 820 and 822, respectively. A common (or system) bus clock generator 810 provides the common or system bus clock to bus agents 802 and 832.

2. Matching the Speed of the Address Bus to the Data Bus

According to an embodiment, the cache line size has been increased to 64 bytes (the cache line size in some Pentium processors is 32 bytes.). Thus, using the quad pumped signaling protocol and a data bus width of with 64 data lines, a cache line (or 64 bytes) can be transmitted or transferred in two bus clock cycles:

64 bytes=(2 cycles)×(4 pumps/cycle) (8 bytes per pump).

However, in some Pentium processors, a request (including an address) is transferred in three bus clock cycles. The three bus clock cycles for the request phase for some Pentium processors included the following:

Cycle 1—sub-phase a—address (provided over the address bus), and a type of request (e.g., read, write).

Cycle 2—sub-phase b—auxiliary details for the request, including byte enables, length, etc (provided over the address lines or address bus).

Cycle 3—a dead cycle or turnaround cycle which allows signals on the bus to quiet down to allow another agent to drive the bus.

Thus, according to an embodiment, a cache line can be transferred over the data bus in two bus clock cycles. However, in some Pentium processors, the address and request timing requires three bus clock cycles for transferring a request. Thus, in some Pentium processors, the address bus timing or bandwidth does not match the speed of the improved quad pumped data bus as described in the above embodiment (see FIG. 5). One of the more scarce and valuable resources is the data bus width and data bus bandwidth. Thus, according to an embodiment, it may be preferable for the data bus bandwidth to throttle or limit the processor bus, not the address bus bandwidth. Therefore, to prevent the address bus from slowing down or throttling the processor bus, it is desirable to adjust the address and request timing on the address bus to at least match the bandwidth or speed of the data bus (in this example, for the transmission of one cache line on the data bus).

Therefore, according to an embodiment, the timing and speed of the request phase provided over the address bus was adjusted to match the overall speed of the data bus. It is desirable to maintain the dead cycle or turnaround cycle. Thus, according to an example embodiment, the address bus was double pumped to provide two information elements (sub-phase a and sub-phase b of the request) in one bus clock cycle.

3. An Example of a Double Pumped Signaling Mode

Figure 6:
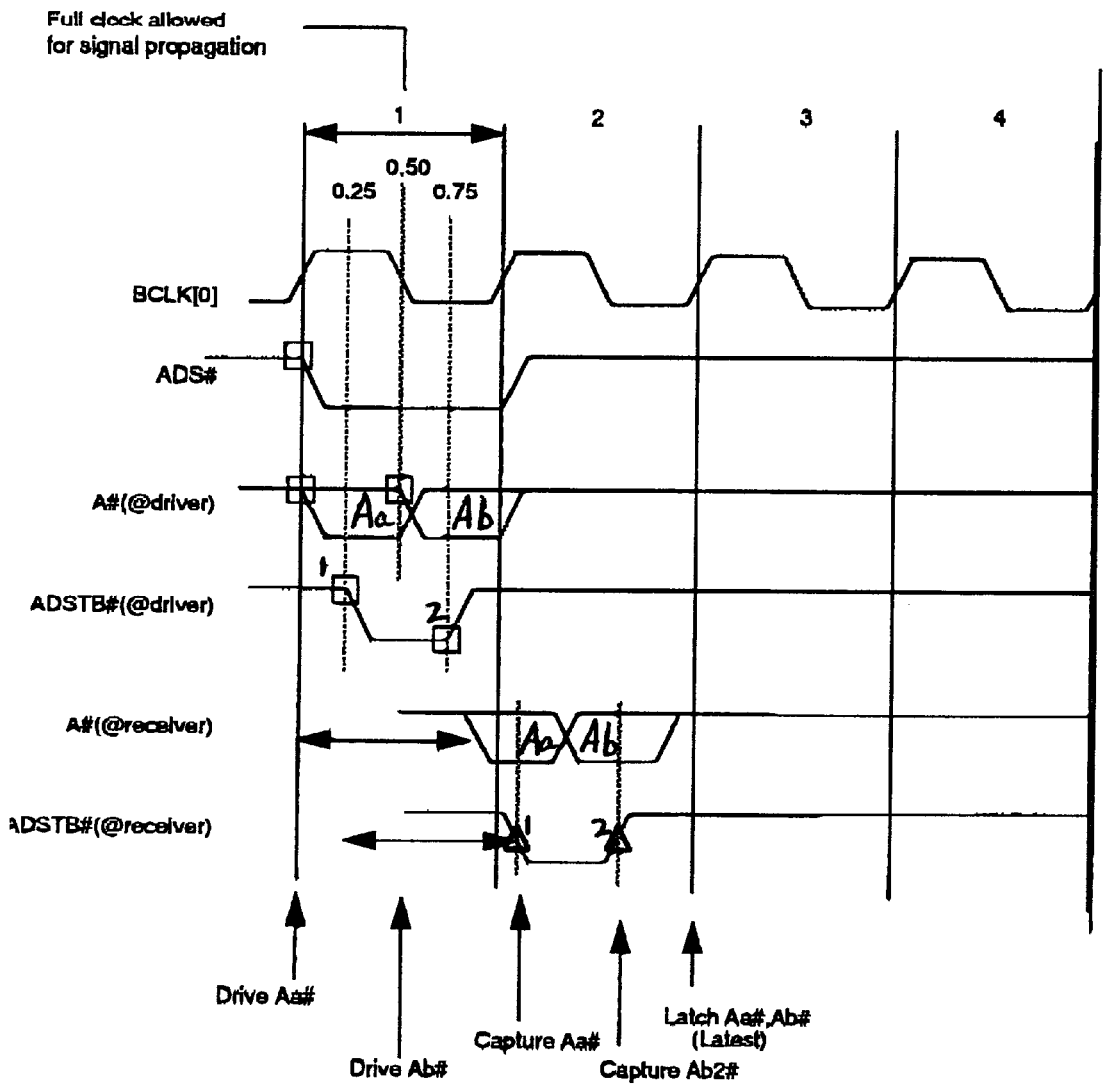
FIG. 6 is a timing diagram illustrating operation of an example double pumped signaling mode according to an embodiment.

In general, according to an embodiment, a double pumped signaling mode operates the appropriate bus signaling group at twice (2×) the frequency of the bus clock (BCLK). FIG. 6 is a timing diagram illustrating operation of an example double pumped signaling mode according to an embodiment. While any signals may be double pumped, the address bus is double pumped in this embodiment.

Referring to FIG. 6, the ADS# signal goes low at the beginning of the request phase. In the double pumped signaling mode, two elements of information are driven onto the bus in the time that it takes to drive one element using the common clock signaling mode (i.e., during one bus clock cycle). Due to flight time (or signal propagation time on the processor bus 117), the second signal group or information element may be driven at the driver before the first element is latched at the receiver(s). According to an embodiment, the driver sends a new information element on the rising edge and the 50% point of the bus clock cycle.

As shown in FIG. 6, sub-phase a of the request (Aa) providing the transaction address is sent on the first half of bus clock cycle 1 beginning at the falling edge at the beginning of bus clock cycle 1. Sub-phase b of the request (Ab) providing some auxiliary details for the transaction is sent on the second half of bus clock cycle 1 beginning at the 50% point of bus clock cycle 1. These two information elements are shown in FIG. 6 as the two rectangles for Aa and Ab for the A# (@driver) lines. (Aa indicates sub-phase a of the request provided over the Address lines, while Ab indicates sub-phase b of the request provided over the Address lines). Thus, the address bus is double pumped because two information elements (Aa and Ab) are transferred or sent during one bus clock cycle.

In addition, because the information for the request will be sent using a double pumped signaling mode (two information elements per bus clock cycle), the information is preferably sent as a source synchronous transfer. Thus, in addition to the two information elements, the driver also drives or activates an address strobe signal to provide two address strobes per bus clock cycle (when activated). The address strobes provide or identify points for sampling the two information elements (Aa and Ab) sent on the address bus.

According to an embodiment, an address strobe signal (ADSTB#) is used that is the same frequency as the bus clock (BCLK). However, to provide two strobes during the one bus clock cycle, both falling edges and rising edges of the address strobe signal will be used as strobes or to identify sampling points for the two information elements provided over the address bus. As shown in FIG. 6, the driver activates an address strobe signal (ADSTB#) at the 25% point of bus clock cycle 1, which is the center of information element 1 (Aa). According to an embodiment, the address strobe for the first information element (Aa or sub-phase a of the request) is provided as the falling edge of the ADSTB# signal (driven at the 25% point of bus clock cycle 1), while the address strobe for the second information element (Ab or sub-phase b of the request) is provided as the rising edge of the ADSTB# signal (driven at the 75% point of bus clock cycle 1 ).

Even though the address strobe has a frequency that is the same as the bus clock, the bus clock should not be used as the strobe signal for the information elements because the bus clock signal does not provide rising and falling edges at the appropriate times. Moreover, the bus clock signal is always activated (as opposed to a strobe signal that is activated only during a source synchronous transfer). The address strobe signal is used to provide strobes or sampling points for the two information elements because the address strobe signal can be activated (turned on) and de-activated (turned off) regardless of the state or phase of the bus clock. By having the strobe driven from the same source as the information, the delay in the strobe matches the delay in the information, and hence allows more than one bit to be on a wire at the same time.

The information elements (Aa and Ab) and the address strobe signal propagate along the processor bus 117 and arrive at the receiver at the beginning of bus clock cycle 2. As shown in FIG. 6, the first information element (Aa) is captured or sampled on the falling edge of the ADSTB# (@receiver) signal and the second information element is captured or sampled on the rising edge of the ADSTB# (@receiver) signal, as shown by the two triangles on the ADSTB#(@receiver) signal. Thus, it can be seen that the receiver deterministically captures the data or information based on an indication from the driver when the data is valid (and should be captured).

According to an embodiment, the latency of the data transfer from the driving agent to any receiver should be less than or equal to one bus clock cycle minus the input latch setup time. This should avoid contention on the address lines (or address bus) and other lines for the second or subsequent phase if the receiver becomes owner of the next phase. The net effect is twice the bandwidth of common clock signaling mode with the effect of adding latency for the first signal group being latched inside the component or receiver.

According to an embodiment, the receiver includes a four element FIFO buffer for storing four information element transmitted over the address bus during the request phase. This allows elements from sub-phase a and sub-phase b of one request to be received and captured in the FIFO, while allowing at the same time elements from a sub-phase a and a sub-phase b of a previous request to be read out of the FIFO and latched at the receiver.

Therefore, according to an embodiment, a single address strobe signal is used at the same frequency as the bus clock to provide the strobes for the two information elements transferred over the address bus. At these frequencies for the address strobe (the same frequency as the bus clock signal), signal attenuation is not a problem. Moreover, any asymmetry in the strobe duty cycle does not pose a problem because only two information elements are transmitted per bus clock cycle. Hence, a single address strobe at the same frequency as the bus clock in which both falling and rising edges are used as strobes can be used for the address strobe signal.

Alternatively, multiple (or two) address strobe signals can be used, with only one of the edges of each address strobe signal being used as a strobe. For example, a first address strobe signal activated (having a falling edge) at the 25% point of cycle 1 and a second address strobe signal activated (having a falling edge) at the 75% point of cycle 1 could be used. Thus, the activation points of the two address strobe signals would be offset or staggered. Because only two elements are driven during one bus clock cycle, the frequency of the address strobe signals could be chosen to be the same as the bus clock frequency, or another frequency.

Figure 9:
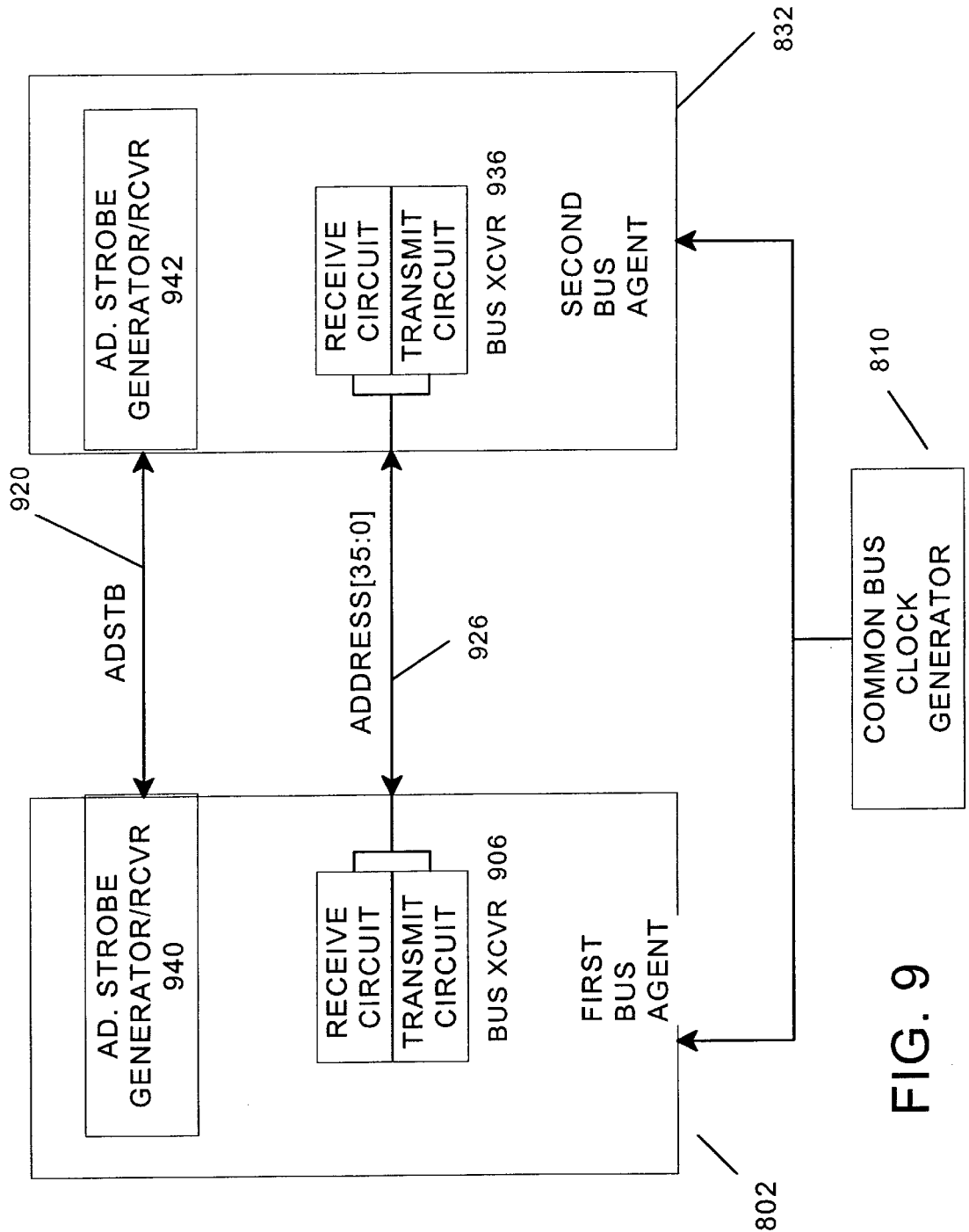
FIG. 9 is a block diagram of an apparatus for transferring information between agents according to another embodiment.

FIG. 9 is a block diagram of an apparatus for transferring information between agents according to another embodiment. A first bus agent 802 is connected to a second bus agent 832. The first bus agent 802 includes an address strobe generator 940 for generating an address strobe signal (e.g., ADSTB#) onto a bidirectional address strobe signal line 920. Bus agent 802 also includes a bus transceiver 906 including a transmit circuit for transmitting or driving address and other signals onto the address bus or address signal lines 926 and a receive circuit for receiving signals received over the address signal lines 926. The second bus agent 832 similarly includes an address strobe generator 942 for generating an address strobe signal onto the bidirectional address strobe signal line 920. The second bus agent 832 also includes a bus transceiver 936 including a receive circuit and a transmit circuit for transmitting signals and receiving signals, respectively, over the address signal lines 926.

As described above, a data transfer of one cache line can be transmitted in two bus clock cycles using the quad pumped signaling mode, and an address request can be transmitted in two bus clock cycles using the double pumped signaling mode. Thus, both the address bus and the data bus have the same peak throughput, which provides a balanced processor bus. Unless otherwise noted, most if not all of the remaining signals are transmitted using the common clock (1x) signaling mode.

VII. Retuning the Bus Protocol to the New Beat Rate of 2 Clock Cycles

As described above, the processor bus provides increased request and data bandwidth through the use of multi pumped signaling protocols. This increase in request bandwidth (on the address bus) and data bandwidth (on the data bus) is done without increasing the data bus width (64 lines), without using an expensive clocking or routing topology, and while maintaining the same basic type of bus protocol as used in some of the Pentium processors.

In some Pentium processors, a common clock signaling mode was used to transmit eight bytes of data per bus clock cycle using 64 data lines, which permitted a 32 byte cache line to be transmitted in four bus clock cycles. According to an embodiment of the invention, the cache line was increased to 64 bytes, and a quad pumped signaling mode (transmitting 32 bytes per bus clock cycle) can be used to send a 64 byte cache line in two bus clock cycles. In addition, in some Pentium processors, a request is transferred in three bus clock cycles, including sub-phase a in bus clock cycle 1, sub-phase b in cycle 2, and a turnaround cycle (or dead cycle) for cycle 3. According to an embodiment of the invention, a double pumped signaling mode is used on the address bus to transfer or transmit both sub-phases a and b of the request in a single bus clock cycle. This reduces the length of the request phase to two bus clock cycles, which matches the length of a cache line transfer (also two bus clock cycles). Thus, because a request phase has a length of two bus clock cycles and a cache line transfer requires two bus clock cycles, the beat rate or beat frequency of the processor bus may generally be considered to be two bus clock cycles.

Figure 7:
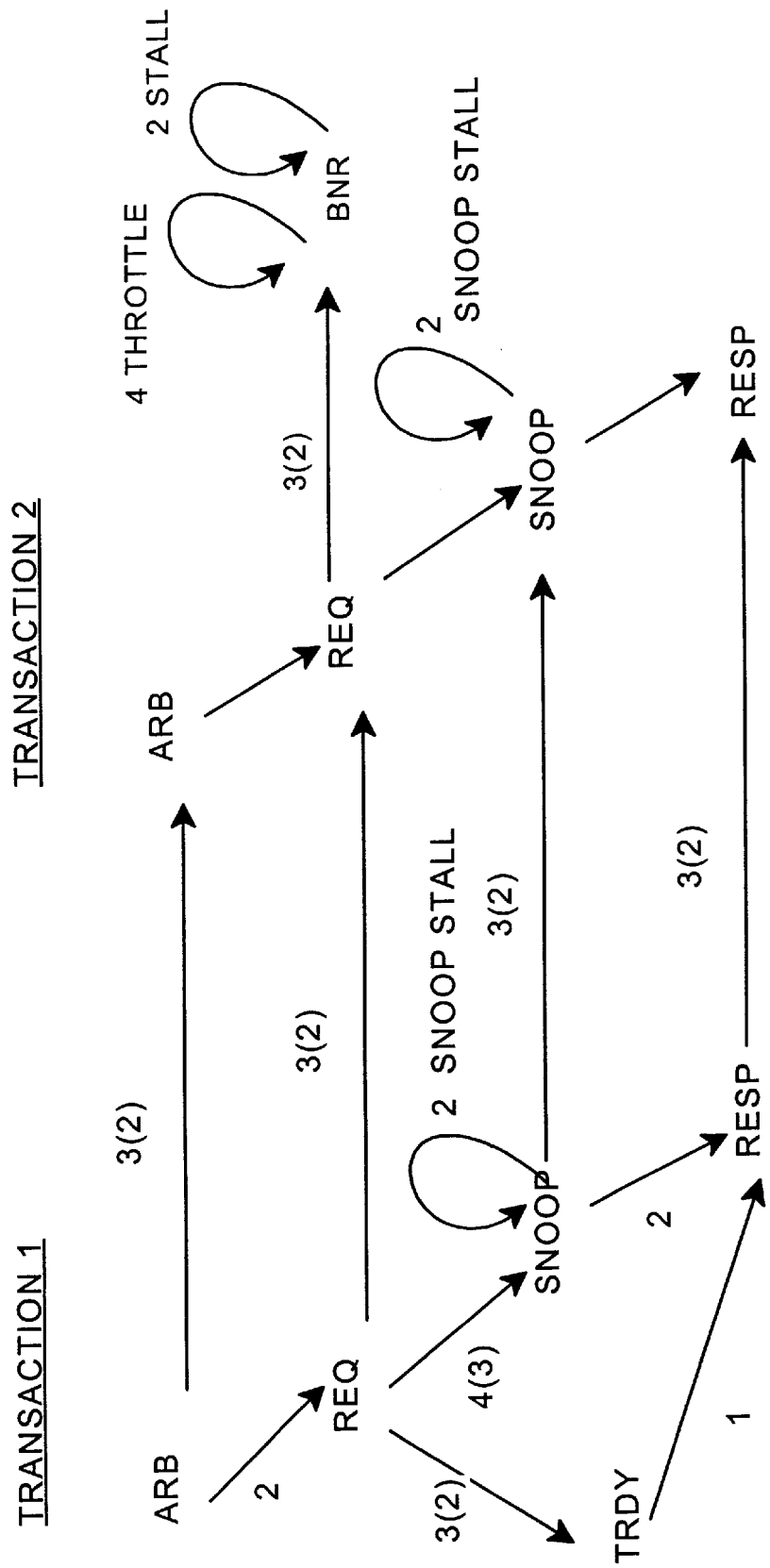
FIG. 7 is a diagram illustrating the minimum latency or delay between transaction phases.

According to an embodiment of the invention, the bus protocol was retuned or modified to adjust the latency or delay between the beginning of successive phases to more closely match the new beat frequency of two bus clock cycles for the processor bus. FIG. 7 is a diagram illustrating the minimum latency or delay between transaction phases (including arbitration, request, snoop and response phases). Arbitration (Arb), request (Req), snoop and response (Resp) phases are shown for two transactions (transaction 1 and transaction 2). Numbers are shown to indicate a latency or delay between phases. The first number indicates the minimum number of bus clock cycles between the beginning of phases as implemented in some Pentium processors, while the second number (which is in parentheses) indicates the new minimum latency between phases after the bus protocol was adjusted or retuned to more closely match the new beat frequency of two bus clock cycles. If only one number is shown, this indicates that there is no change in the delay or latency between phases as between some Pentium processors and an embodiment of the invention.

As noted above, the minimum latency between the phases shown in FIG. 7 is typically two bus clock cycles. Referring to FIG. 7, the minimum latency between the beginning of an arbitration phase and the beginning of a request phase for a transaction (e.g., transaction 1) remains unchanged at two bus clock cycles. The minimum latency from the beginning of a request phase to the beginning of a snoop phase of a transaction has been decreased from four bus clock cycles to three cycles. The minimum latency between the beginning of a snoop phase to the beginning of a response phase remains unchanged at two bus clock cycles. The minimum latency between the beginning of the request phase and when a target agent can assert the TRDY# signal has been decreased from three to two bus clock cycles. The minimum latency from assertion of the TRDY# signal to the beginning of the response phase remains unchanged at two bus clock cycles.

In addition, the minimum latency between the same or corresponding phases of successive transaction has been modified to more closely match the beat frequency of two clock cycles. Referring to FIG. 7 again, the minimum latency between successive arbitration phases (e.g., minimum latency between beginning of arbitration phase of transaction 1 and the beginning of arbitration phase of transaction 2) has been decreased from three bus clock cycles to two cycles. The minimum latency between successive request phases has been decreased from three bus clock cycles to two. The minimum latency between successive snoop phases has been decreased from three bus clock cycles to two. And, the minimum latency between successive response phases has been decreased from three bus clock cycles to two.

Each of the phases will be described along with a brief explanation of some changes or modifications to the bus protocol for that phase that contributed to a decrease in latency between phases (where a decrease in latency occurred).

When a requesting agent does not own the bus, transactions begin with an arbitration phase, in which a requesting agent becomes the bus owner. After the requesting agent becomes the bus owner, the transaction enters the request phase. In a first sub-phase (sub-phase a) of the request phase, an ADS# signal (indicating valid address) is driven along with the transaction address and sufficient information to begin snooping and memory access. In the second sub-phase (sub-phase b) of the request phase, various auxiliary information for the request is driven onto the bus 117, including byte enables (indicating which data bytes will be provided on the data lines), a deferred ID, transaction length and other transaction information. The first and second sub-phases are driven during one bus clock cycle. As a result, according to an embodiment, the request information (e.g., much of which is provided over the address bus) is said to have a 2× data transfer rate.

According to an embodiment, every transaction has a snoop phase. The snoop results from the snoop phase indicate whether the address driven for a transaction references a valid or modified (dirty) cache line in any bus agent's cache. The snoop results also indicate whether a transaction will be completed in-order or may be deferred for possible out-of-order completion. An agent can delay a transaction if it is not ready to snoop by stretching the snoop phase using a snoop stall.

Each of the phases will be described, and highlighting the differences implemented to decrease latency between phases (where applicable).

1) Arbitration phase: No transactions can be issued until the bus agent owns the processor bus 117. A transaction only needs to have this phase if the agent that wants to drive the transaction onto the processor bus 117 doesn't already own the bus 117. According to an embodiment, a bus arbitration protocol is provided that supports two classes of bus agents: symmetric agents, and priority agents. Processors on bus 117 typically arbitrate as symmetric agents. The priority agent (e.g., system interface 116) usually arbitrates on behalf of the I/O subsystem (I/O bridge 124 or I/O agents) and the memory subsystem (memory agents located in the main memory subsystem 122).

An example signal group which can be used to arbitrate for bus ownership is shown below (As used herein, the # sign indicates active low signals):

Example Arbitration Signals

| Pin/Signal Name | Pin Mnemonic | Signal Mnemonic |
| --- | --- | --- |
| Symmetric Agent Bus Request | BR[3:0]# | BREQ[3:0]# |
| Priority Agent Bus Request | BPRI# | BPRI# |
| Block Next Request | BNR# | BNR# |
| Lock | LOCK# | LOCK# |

The processor bus 117 allows a plurality of agents to simultaneously arbitrate for the bus 117. The symmetric agents arbitrate for the bus 117 based on round robin rotating priority scheme. The arbitration scheme guarantees fair access to a request phase for all symmetric agents. Each symmetric agent has a unique Agent ID assigned at reset (e.g., agents 0, 1, 2, 3) and arbitration will occur in circular order. After reset, agent 0 has the highest priority followed by agents 1, 2, and 3. Each symmetric agent maintains a common Rotating ID that reflects the symmetric Agent ID of the most recent bus owner. On every arbitration event, the symmetric agent with the highest priority becomes the owner and may enter into the request phase if there is no other action of higher priority preventing use of the bus. The priority agent(s) has higher priority that the symmetric owner.

A symmetric agent requests the bus by asserting its BREQn# signal. Based on the value sampled on BREQ[3:0] and the last symmetric bus owner, all agents can simultaneously determine the next symmetric bus owner. A priority agent asks for the bus by asserting BPRI#, which temporarily overrides the arbitration scheme because no other symmetric agent will issue another unlocked bus transaction until BPRI# is sampled inactive. The priority agent is always the next bus owner. The BNR# signal can be asserted by any bus agent to block further transactions from being issued to the bus (usually used when system resources such as buffers are filled and cannot accommodate another transaction). The assertion of the LOCK# signal indicates that the bus agent is executing an atomic sequence of bus transactions that must not be interrupted.

The priority agent can deassert BPRI# and release bus ownership in the same cycle that it generates its last request. In some Pentium processors, after the BPRI# signal is asserted, the BPRI# signal must be deasserted for a minimum of two bus clock cycles. This matched the old 3 bus clock cycle rate (in some Pentium processors), and so provided symmetric agents and priority agents balanced access to the bus. According to an embodiment, the protocol was changed to require the BPRI# signal to be deasserted only for a minimum of one bus clock cycle after being asserted. This change in a current embodiment supports a two bus clock cycle beat rate, one bus clock cycle for assertion and one cycle for deassertion.

As noted, the BNR# signal can be used to delay further requests, for example, when an agent does not have sufficient resources to support another transaction. According to an embodiment, a request stall protocol is implemented and is determined based on three states:

1) Free: In this state, an agent's ability to issue requests is not limited by the BNR# request stall protocol, but is limited only by its ownership of the bus and by the request rate. In some Pentium processors, the BNR# sampling point in the free state occurs three clock cycles after ADS# is sampled asserted. According to an embodiment, the BNR# sampling point was adjusted to occur two clock cycles (rather than three) after the ADS# signal is sampled asserted. When an agent intends to stop a new request generation in the free state, the agent drives BNR# active in the clock cycle before a valid BNR# sampling point from ADS#. In the next clock cycle, all agents observe an active BNR# on a BNR# sampling point and transition to the stalled state.

2) Throttled: An agent may issue one request in this state once it has ownership of the bus and the maximum ADS# request rate has been maintained. The BNR# sample point is in the first clock cycle of the throttled state. When in the throttled state, if BNR# is sampled active on a BNR# sampling point, the state transitions to the stalled state. If BNR# is sampled inactive on a BNR# sampling point, the state transitions to the free state.

3) Stalled: In this state, an agent may not issue a request until BNR# sampled at the BNR# sampling point was inactive. The BNR# sampling point begins in the bus clock cycle when the stalled state is entered and every other subsequent clock cycle as long as BNR# is sampled active at its sampling point. A request stall state is always initialized to stalled after a reset event (either INIT# or RESET#). An agent can extend the stalled state by asserting BNR# every two clock cycles (before the valid sampling points). If BNR# is not sampled active while in the stalled state, the request stall state will transition to the throttle state.

Therefore, requiring the BPRI# signal to be deasserted only for a minimum of one bus clock cycle (rather than two) after being asserted, and adjusting the BNR# sampling point in the free state to occur two clock cycles (rather than three) after the ADS# signal is sampled asserted decreases the minimum latency between the beginning of successive arbitration phases from three bus clock cycles to two bus clock cycles.

2) Request Phase: The request phase is the phase in which the transaction is actually issued or driven to the bus. According to an embodiment the request phase is one common bus clock cycle in duration. The request phase includes two sub-phases, including sub-phase a (during the first half of the request phase) and sub-phase b (during the second sub-phase of the request phase). Request information is transmitted during the request phase, including the transaction address. The request phase begins with the assertion of the ADS# signal, the address strobe signal. Here is an example group of signals that can be used to transmit a request.

Example Request Signals

| Pin Name | Pin Mnemonic | Signal Name | Signal Mnemonic | Number |
|---|---|---|---|---|
| Address Strobe | ADS# | Address Strobe | ADS# | 1 |
| Request Command | REQ[4:0]# | Request[a] Extended Request[b] | REQa[4:0]# REQb[4:0]# | 5 |
| Request Strobes | ADSTB[1:0]# | Request Strobes | ADSTB[1:0]# | 2 |
| Address | A[35:3]# | Address[a] Reserved[b] Attributes[b] Deferred ID[b] Byte Enables[b] Extended Functions[b] | Aa[35:3]# Ab[35:32]# ATTR[7:0]# or Ab[31:24]# DID[7:0]# or Ab[23:16]# BE[7:0]# or Ab[15:8]# EXF[4:0]# or Ab[1:0]# | 33 |

Notes:
[a]These signals are driven on the indicated pin during the first sub-phase (sub-phase a) of the Request phase.
[b]These signals are driven during the second sub-phase (sub-phase b) of the Request phase.

Thus, the transaction address is transmitted on Aa[35:3] (where the "A" indicates address lines or address bus 204 and "a" indicates signals transmitted during sub-phase a), and additional information (e.g., byte enables, attributes, extended functions) describing the transaction is transmitted on Ab[35:3] ("b" indicating that the additional information is transmitted over the address lines during sub-phase b). The assertion of ADS# defines the beginning of the request phase. ADSTB[1:0]# should preferably toggle once in every bus clock cycle that ADS# is asserted, and not in any other cycles. The REQa[4:0]# and REQb[4:0]# identify the transaction type.

According to an embodiment, the request can be driven onto the processor bus:

1) clock cycle after ownership observation; and
2) two or more clock after ADS# assertion for the previous transaction. and
3) BNR# is observed inactive. and
4) LOCK#, if not activated by this agent, is observed inactive Some Pentium processors required a minimum delay of three clock cycles after assertion of ADS# of the previous transaction before the request could be driven onto the processor bus. To decrease the minimum latency between request phases of successive transactions from three clock cycles to two clock cycles, an agent may drive the request onto the bus after only two bus clock cycles after assertion of the ADS# signal of the previous transaction, according to an embodiment. As noted above, the ADS# signal identifies the beginning of the request phase, and indicates that sub-phase a of the request is being driven onto the processor bus including an address (provided over the address bus) and the request (provided over the REQ#[4:0] lines).

3) Snoop Phase: According to an embodiment, the processor bus supports cache coherency for multiple caching agents. Coherency (or data consistency) ensures that a system or computer with multiple levels of cache and memory and multiple caching agents present a shared memory model in which preferably no agent ever reads stale (or incorrect) data and actions can be serialized as needed. A line is the unit of caching in the caching agents. According to an embodiment, a cache line is 64 bytes, but other size cache lines can be used.

The cache protocol associates states with lines and defines rules governing state transitions. Each line has a state in each cache. According to an embodiment, there are four line states, including: M (Modified) which indicates that the line is in this cache and contains a more recent value of the line than in memory, and the line is invalid in all other agents; E (Exclusive)indicating that the line is in this cache and is the same value as in memory and is invalid in all other agents; S (Shared) indicating that the line is in this cache, contains the same value as in memory and may be in other agents; and I (Invalid) indicating that the line is not available in this cache and should be fetched from another cache or agent.

The snoop phase is the phase in which cache coherency is enforced. The following is an example list of snoop signals which can be used during a snoop phase:

Example Snoop Signals

| Signal Function | Pin Name | Driver |
|---|---|---|
| Keeping a Non-Modified Cache Line | HIT# | Agent with shared line |
| Hit to Modified Cache Line | HITM# | Agent with dirty line |
| Defer Transaction Completion | DEFER# | Responding Agent |

In the snoop phase, all caching agents drive their snoop results and participate in cache coherency resolution. The agents generate internal snoop results for nearly all memory transactions, that are not its own. All caching agents (snoop agents) drive their snoop results onto the bus in this phase using the HIT# and HITM# signals. HIT# is asserted during the snoop phase to indicate that a copy of a cache line that contains the requested data resides in another agent's cache on this interface. HITM# is asserted during the snoop phase to indicate that a modified copy of the cache line that contains the requested data resides in another agent's cache on this interface. If HIT# and HITM# are simultaneously asserted by an agent during a snoop phase, then a snoop stall has occurred and the current snoop phase should be extended. DEFER# is asserted during the snoop phase to indicate that he current transaction is not guaranteed to be completed.

In some Pentium processors, the snoop results were driven four clock cycles after the ADS# signal is asserted and at least three clock cycles from the snoop phase of the previous transaction. However, according to an embodiment, these minimum latencies were modified to more closely match the new beat frequency of the processor bus. According to an embodiment, the snoop results can now be driven three clock cycles after the ADS# signal is asserted (i.e., three bus clock cycles after the beginning of the request phase) and at least two clock cycles after the snoop phase of the previous transaction (i.e., at least two clock cycles after the snoop results were driven onto the bus for the previous transaction). Thus, the maximum activation rate for HIT#/HITM#/DEFER# signals (snoop result) was changed from once per every three bus clock cycles to once per every two bus clock cycles. Note that the latency from the ending of the request phase (sub-phase B) to the snoop phase remains the same since the request phase was shortened by one cycle.

4) Response Phase: In this, phase the response agent drives the transaction response onto the processor bus. Requests initiated in the request phase enter an in-order queue maintained by every bus agent. The responding agent is the agent responsible for completing the transaction at the top of the in-order queue. The responding agent is the device or agent addressed by the transaction during the request phase. Below is an example group of signals that can be used in the response phase:

Example Response Signals

| Type | Signal Names | Number |
| --- | --- | --- |
| Response Status | RS[2:0]# | 3 |
| Response Parity | RSP# | 1 |
| Target Ready | TRDY# | 1 |

The transaction response is encoded on the RS[2:0]# signals. Examples of possible responses include: a normal data response (where the responding agent is required to transfer read data along with the response), a retry response (when DEFER# is asserted during the snoop phase indicating that the transaction must be retried), a deferred response (where the response agent or responding agent promises to complete the transaction in the future using the Deferred Reply Transaction), a no data response(where no data will be returned by the addressed agent), etc. TRDY# is asserted by the responding agent to indicate that it is ready to accept write or writeback data, etc. The RSP# signals provide parity for the RS signals.

In some Pentium processors, the response could be driven after a minimum of three bus clock cycles after the response phase of the previous transaction. According to an embodiment, this minimum latency between response phases of successive transactions was adjusted to more closely match the new beat frequency of the processor bus. According to an embodiment, a response can be driven after a minimum of two bus clock cycles after the response of the previous transaction. This minimum latency is typically subject to other constraints which may extend this latency. Due to the double pumped signaling mode used for the request signals, a response can be driven once per every two bus clock cycles (as compared to once per every three bus clock cycles for some Pentium processors).

A request initiated transaction is a transaction where the request agent has write data to transfer. The addressed agent asserts TRDY# to indicate its ability to receive data from the request agent intending to perform a write operation. In some Pentium processors, the TRDY# signal could be asserted after a minimum of three bus clock cycles after assertion of ADS# signal for the same transaction. There are typically other constraints which can lengthen this latency. This latency was modified to more closely match the new beat frequency of processor bus. According to an embodiment, an addressed agent can assert the TRDY# signal after a minimum of two bus clock cycles after assertion of ADS# signal for the same transaction. Note that the latency from the end of the request phase to TRDY# remains unchanged.

5) Data (Transfer) Phase: During the Data phase, data is transferred between different bus agents over the processor bus 117. Based on the request phase, a transaction either contains a "request-initiated" (write) data transfer, a "response-initiated" (read) data transfer, or no data transfer. The data phase may overlap with the request phase for a transaction.

Below is an example list of signals that can be used in the data phase:

Example Data Signals

| Type | Signal Names | Number |
| --- | --- | --- |
| Data Ready | DRDY# | 1 |
| Data Bus Busy | DBSY# | 1 |
| Data Strobes | DSTBp[3:0]# DSTBp[3:0]# | 8 |
| Data | D[63:0]# | 64 |
| Data Inversion | DINV[3:0]# | 4 |
| Data parity | DP[3:0]# | 4 |

DRDY# indicates that valid data has been placed on the bus 117 and must be latched. The data bus owner asserts DRDY# for each bus clock cycle in which valid data is to be transferred. DRDY# can be deasserted to insert wait states in the data phase. DBSY# can be used to hold the data bus before the first DRDY# assertion and between subsequent DRDY# assertions for a multiple bus clock data transfer. DINV[3:0]# are used to indicate that the data bits have been inverted by the data source.

The data signals D[63:0]# of the data bus 206 (FIG. 2) provide a 64-bit data path between bus agents. For a partial transfer, including I/O read and I/O write transactions, the byte enable signals (BE[7:0]#) determine which bytes of the data bus will contain the valid data. The DP signals can be used to provide parity for the data signals.

According to an embodiment, data may be transferred using a quad pumped (i.e, 4×) source synchronous latched protocol in which the data signals D[63:0]# are used to transmit four 8-byte data elements in a single bus clock cycle. The first 8-bytes (in burst order) are transmitted in the first quarter of the bus clock, the second 8-byte element in the second quarter of the bus clock, the third 8-byte element in the third quarter of the bus clock and the fourth 8-byte element in the fourth quarter of the bus clock. The data can be transferred in the first quarter of the bus clock if the data to be transferred is 1 to 8 bytes in length, and the data can be transferred in the first two quarters of the bus clock if thee data is 9–16 bytes in length.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A bus agent comprising:
   a block next request signal interface; an address strobe signal interface;
   arbitration logic to initiate an arbitration phase after two clocks from a prior arbitration phase and to receive a block next request signal on the block next request signal interface two bus clock cycles after assertion of an address strobe signal occurs on the address strobe signal interface and to respond to said block next request signal; and
   quad pumped data bus interface logic.

2. The bus agent of claim 1, further comprising:
   double pumped address bus interface logic; and
   double pumped request bus interface logic.

3. The bus agent of claim 2, wherein said arbitration logic is to respond to said block next request signal by transitioning to a stalled state and thereafter remaining in said stalled state if said block next request signal remains asserted at a block next request sampling point every two clocks, the stalled state preventing the bus agent from issuing bus requests.

4. The bus agent of claim 1, further comprising:
   a plurality of data interfaces;
   a plurality of data strobe interfaces;
   a common clock interface for a bus clock signal having a bus clock frequency;
   data strobe generation logic to generate a first data strobe signal and a second data strobe signal on a first data strobe interface and a second data strobe interface, said first data strobe signal and said second data strobe signal having a data strobe frequency of twice said bus clock frequency; and
   data transmit logic to transmit data elements synchronized to a first edge of said first data strobe signal on said plurality of data interfaces and to transmit data elements synchronized to a first edge of said second data strobe signal also on said plurality of data interfaces.

5. The bus agent of claim 4, further comprising: a plurality of address interfaces;
   address strobe generation logic to generate a first address strobe having an address strobe frequency which is the same as said bus clock frequency; and address transmit logic to transmit address elements synchronized to a first edge of said first address strobe on said plurality of address interfaces and to transmit address elements synchronized to a second edge of said first address strobe also on said plurality of address interfaces.

6. The bus agent of claim 5, further comprising:
   a plurality of request interfaces;
   wherein said address transmit logic is to transmit request elements synchronized to a first edge of said first address strobe on said plurality of request interfaces and to request elements synchronized to a second edge of said first address strobe also on said plurality of request interfaces.

7. The bus agent of claim 1, further comprising:
   a plurality of address interfaces;
   a plurality of request interfaces;
   address strobe generation logic to generate a first address strobe having an address strobe frequency which is the same as a bus clock frequency; and address transmit logic to transmit address elements synchronized to a first edge of said first address strobe on said plurality of address interfaces and to transmit address elements synchronized to a second edge of said first address strobe also on said plurality of address interfaces and to transmit request elements synchronized to a first edge of said first address strobe on said plurality of request interfaces and to request elements synchronized to a second edge of said first address strobe also on said plurality of request interfaces.

8. The bus agent of claim 7, wherein said first address strobe comprises two substantially identical address strobes.

9. The bus agent of claim 8, wherein a first one of the two substantially identical address strobes is to be transmitted synchronized to a first subset of the plurality of address interfaces and the plurality of request interfaces and wherein a second one of the two substantially identical address strobes is to be transmitted synchronized to a second subset of the plurality of address interfaces and the plurality of request interfaces, the second subset consisting of remaining ones of the plurality of address interfaces and the plurality of request interfaces that are not in the first subset.

10. The bus agent of claim 1, wherein said bus agent is a priority agent, said priority agent further comprising:
    a priority agent bus request interface, wherein said arbitration logic is to assert a priority agent bus request signal on said priority agent bus request interface with a minimum deassertion time of one bus clock cycle.

11. The bus agent of claim 1, wherein said arbitration logic is to respond to said block next request signal by transitioning from a free state to a throttled state if the bus agent was in the free state when the block next request signal was received and by transitioning from the throttled state to a stalled state if the block next request signal remains asserted two clocks later, and thereafter to remain in said stalled state if said block next request signal remains asserted at a block next request sampling point every two clocks, the stalled state preventing the bus agent from issuing bus requests.

12. A method, comprising:
    asserting a first request signal as a part of a first arbitration phase of a first transaction;
    asserting a second request signal as a part of a second request phase of a second transaction in a pipelined manner prior to completion of said first transaction;
    asserting an address strobe signal as a part of a request phase of the first transaction;
    receiving a block next request signal two bus clock cycles after assertion of the address strobe signal;
    responding to said block next request signal; and
    providing a plurality of complementary strobe signal pairs in a data phase; and providing four data elements per bus clock cycle transmitted in a source synchronous manner in conjunction with said plurality of complementary strobe signal pairs.

13. The method of claim 12, wherein said first request signal is asserted by a first bus agent and wherein said second request signal is asserted by a second bus agent.

14. The method of claim 12, wherein said first request signal and said second request signal are asserted by a first bus agent.

15. The method of claim 12, further comprising: providing a plurality of address strobes; and
    providing two request elements and two address elements per bus clock cycle transmitted in a source synchronous manner in conjunction with said plurality of address strobes.

16. The method of claim 15, wherein said providing four data elements comprises:

providing a first data element synchronized to a first edge of a first type of a first one of a pair of data strobe signals;

providing a second data element synchronized to a first edge of the first type of a second one of the pair of data strobe signals;

providing a third data element synchronized to a second edge of the first type of the first one of the pair of data strobe signals; and providing a fourth data element synchronized to a second edge of the first type of the second one of the pair of data strobe signals.

17. The method of claim 16, wherein said first type of edge is a falling edge.

18. The method of claim 16, wherein said providing two request elements and two address elements comprises:

providing a first address element and a first request element synchronized to a first edge at least one of the plurality of address strobe signals; and providing a second address element and a second request element synchronized to a second edge of the at least one of the plurality of address strobe signals.

19. The method of claim 18, wherein said first edge is an address strobe falling edge and the second edge is an address strobe rising edge.

20. The method of claim 12, wherein responding comprises:

transitioning to a stalled state and thereafter remaining in said stalled state if said block next request signal remains asserted at a block next request sampling point every two clocks, the stalled state preventing the bus agent from issuing bus requests.

21. The method of claim 12, wherein responding comprises: transitioning from a free state to a throttled state if the bus agent was in the free state when the block next request signal was received;

transitioning from the throttled state to a stalled state if the block next request signal remains asserted two clocks later; and remaining in said throttled state if said block next request signal remains asserted at a block next request sampling point every two clocks, the stalled state preventing the bus agent from issuing bus requests.

22. A system, comprising: a bus agent;

a block next request signal interface;

a priority agent bus request input interface; an address strobe signal interface;

bus agent arbitration logic to initiate an arbitration phase after two clocks from a prior arbitration phase and to receive a block next request signal on the block next request signal interface two bus clock cycles after the assertion of an address strobe signal occurs on the address strobe signal interface and to respond to said block next request signal; and a priority bus agent comprising:

a priority agent bus request interface;

priority bus agent arbitration logic capable of to assert a priority agent bus request signal on said priority agent bus request interface with a minimum deassertion time of one bus clock cycle; and quad pumped source synchronous data bus interface logic.

23. The system of claim 22, wherein said bus agent and said priority bus agent both further comprise:

double pumped source synchronous address bus interface logic.

24. The system of claim 23, wherein said bus agent and said priority bus agent both further comprise:

double pumped source synchronous request bus interface logic.

25. The system of claim 24, wherein said system further comprises a plurality of control signals that operate according to a common clock protocol.

* * * * *